United States Patent
Bommareddy et al.

(10) Patent No.: US 8,204,166 B2
(45) Date of Patent: Jun. 19, 2012

(54) CLOCK CIRCUIT WITH CLOCK TRANSFER CAPABILITY AND METHOD

(75) Inventors: Srinivasa R. Bommareddy, Gilbert, AZ (US); Uday Padmanabhan, Chandler, AZ (US); Samir J. Soni, Chandler, AZ (US); Koichi E. Nomura, Gilbert, AZ (US); Nicholas F. Jungels, Gilbert, AZ (US); Vivek Bhan, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 917 days.

(21) Appl. No.: 11/868,711

(22) Filed: Oct. 8, 2007

(65) Prior Publication Data

US 2009/0092214 A1    Apr. 9, 2009

(51) Int. Cl.
*H03L 7/06* (2006.01)
*H04Q 1/20* (2006.01)

(52) U.S. Cl. ........ 375/354; 375/371; 375/373; 375/226; 375/294; 327/2; 327/147; 327/144

(58) Field of Classification Search .......... 375/354, 375/359–360, 362, 365, 366, 371, 373–376, 375/240.26–240.28, 224, 226; 327/2–3, 327/7, 141, 144–145, 150, 152–156, 158, 327/161, 163, 231–237
See application file for complete search history.

(56) References Cited

U.S. PATENT DOCUMENTS

| 4,189,622 | A | 2/1980 | Foshee |
| 5,953,284 | A | 9/1999 | Baker et al. |
| 6,577,689 | B1 | 6/2003 | Smith et al. |
| 6,704,892 | B1 * | 3/2004 | Kurd et al. ............ 714/724 |
| 6,748,408 | B1 * | 6/2004 | Bredin et al. ............ 708/271 |
| 6,784,699 | B2 | 8/2004 | Haroun et al. |
| 6,873,183 | B1 | 3/2005 | Kaviani et al. |
| 7,003,683 | B2 | 2/2006 | Muroor |
| 7,071,738 | B1 | 7/2006 | Nguyen et al. |

(Continued)

FOREIGN PATENT DOCUMENTS

JP        08331189 A    12/1996

(Continued)

OTHER PUBLICATIONS

International Search Report issued for coordinating PCT Application No. PCT/US2008/076515 mailed Mar. 27, 2009.

*Primary Examiner* — Kevin M. Burd
*Assistant Examiner* — Linda Wong
(74) *Attorney, Agent, or Firm* — James L. Clingan, Jr.

(57) ABSTRACT

An apparatus including a multiplexer configured to provide an output clock selected from a source clock, a destination clock, and a transition clock is provided. The apparatus further includes a phase difference calculation module configured to calculate a phase difference between the source clock and the destination clock and a clock generation module configured to generate a plurality of clocks. The apparatus further includes a clock selection module configured to select one of the plurality of clocks as the transition clock and a control circuit configured to provide: (1) a signal to the clock selection module for selecting one of the plurality of clocks as the transition clock based on the phase difference between the source clock and the destination clock and (2) a signal to the multiplexer to provide as the output clock one of the source clock, the destination clock, or the transition clock.

20 Claims, 2 Drawing Sheets

U.S. PATENT DOCUMENTS

| | | | | |
|---|---|---|---|---|
| 7,231,009 B2* | 6/2007 | Kim et al. | | 375/354 |
| 7,236,028 B1* | 6/2007 | Choi | | 327/158 |
| 7,778,375 B2* | 8/2010 | Lu | | 375/375 |
| 7,974,375 B2* | 7/2011 | Kim et al. | | 375/376 |
| 2001/0040888 A1* | 11/2001 | Guinea et al. | | 370/369 |
| 2002/0110211 A1* | 8/2002 | Bockelman | | 375/371 |
| 2002/0140486 A1* | 10/2002 | Boerstler et al. | | 327/291 |
| 2003/0038681 A1* | 2/2003 | Djafari et al. | | 331/1 A |
| 2004/0130366 A1* | 7/2004 | Lin et al. | | 327/158 |
| 2004/0136483 A1* | 7/2004 | Cao | | 375/373 |
| 2005/0078021 A1 | 4/2005 | Cohen et al. | | |
| 2006/0066368 A1* | 3/2006 | Gabato et al. | | 327/158 |
| 2006/0129868 A1* | 6/2006 | Matsumoto et al. | | 713/500 |
| 2007/0001661 A1* | 1/2007 | Loke et al. | | 324/76.53 |
| 2007/0172014 A1* | 7/2007 | Moriwaki et al. | | 375/376 |
| 2008/0008282 A1* | 1/2008 | Ikeda | | 375/371 |
| 2008/0075222 A1* | 3/2008 | Lee et al. | | 375/376 |
| 2008/0272814 A1* | 11/2008 | Chiang et al. | | 327/175 |

FOREIGN PATENT DOCUMENTS

JP       09331189 A        12/1996

* cited by examiner

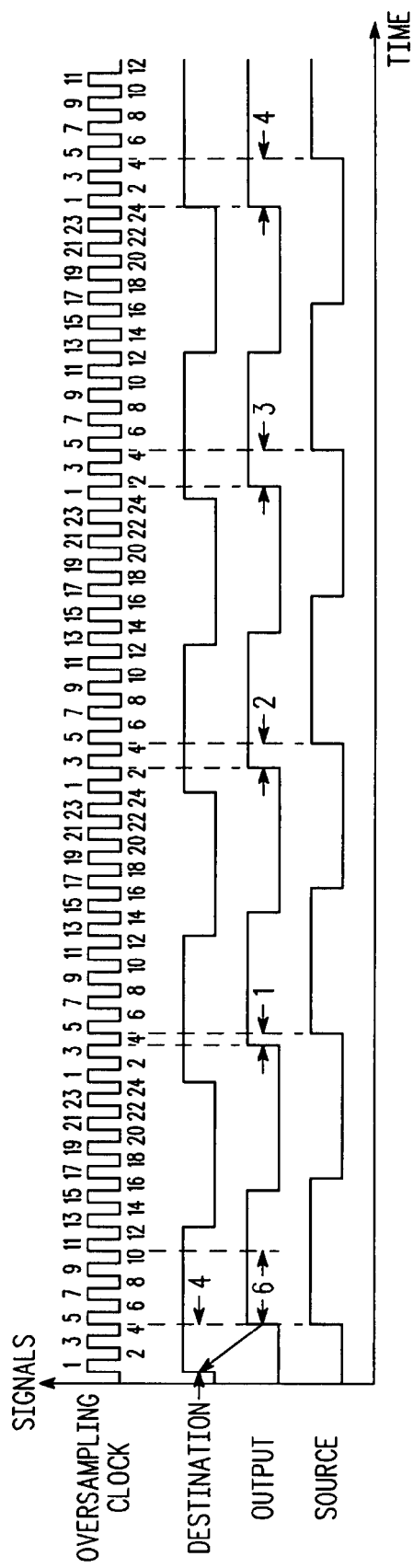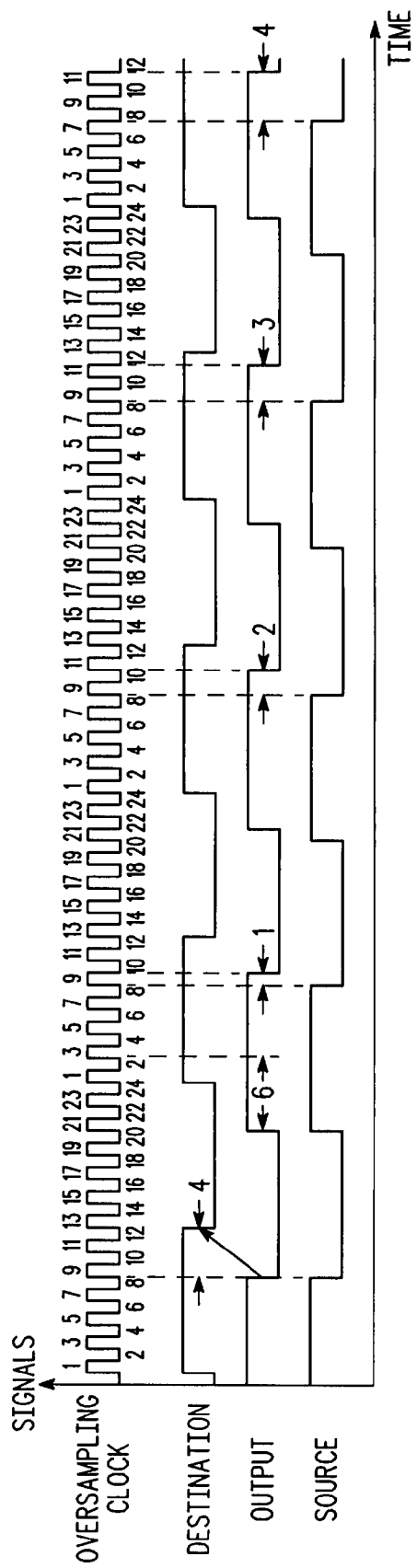

CLOCK CIRCUIT WITH CLOCK TRANSFER CAPABILITY AND METHOD

BACKGROUND

1. Field

This disclosure relates generally to clock circuits for use by a system, and more specifically, to a clock circuit that can switch from one clock to another clock for use by a system.

2. Related Art

Particularly in systems that use a battery, power conservation is a major concern. In the case of mobile phones, communication is wireless using radio frequency (RF) communication. For effective communication, a clock is required that is closely controlled which requires a phase locked loop (PLL). PLLs generally require significant power. On the other hand it is common for a mobile phone to have other functions that do not require the closely controlled clock and thus do not require a PLL. Thus a technique for saving power is to use the closely controlled clock only when it is required and use another clock for the other operations. Switching between clocks, however, may result in problems such as glitches and abrupt phase changes, for the system during the transition.

Thus there is a need for a clock transition that avoids or reduces problems that may occur due to the transition.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a timing diagram useful in understanding the operation of the clock transition circuit of FIG. 1; and FIG. 3 is another timing diagram useful in understanding the operation of the clock transition circuit of FIG. 1.

DETAILED DESCRIPTION

Figure 1:
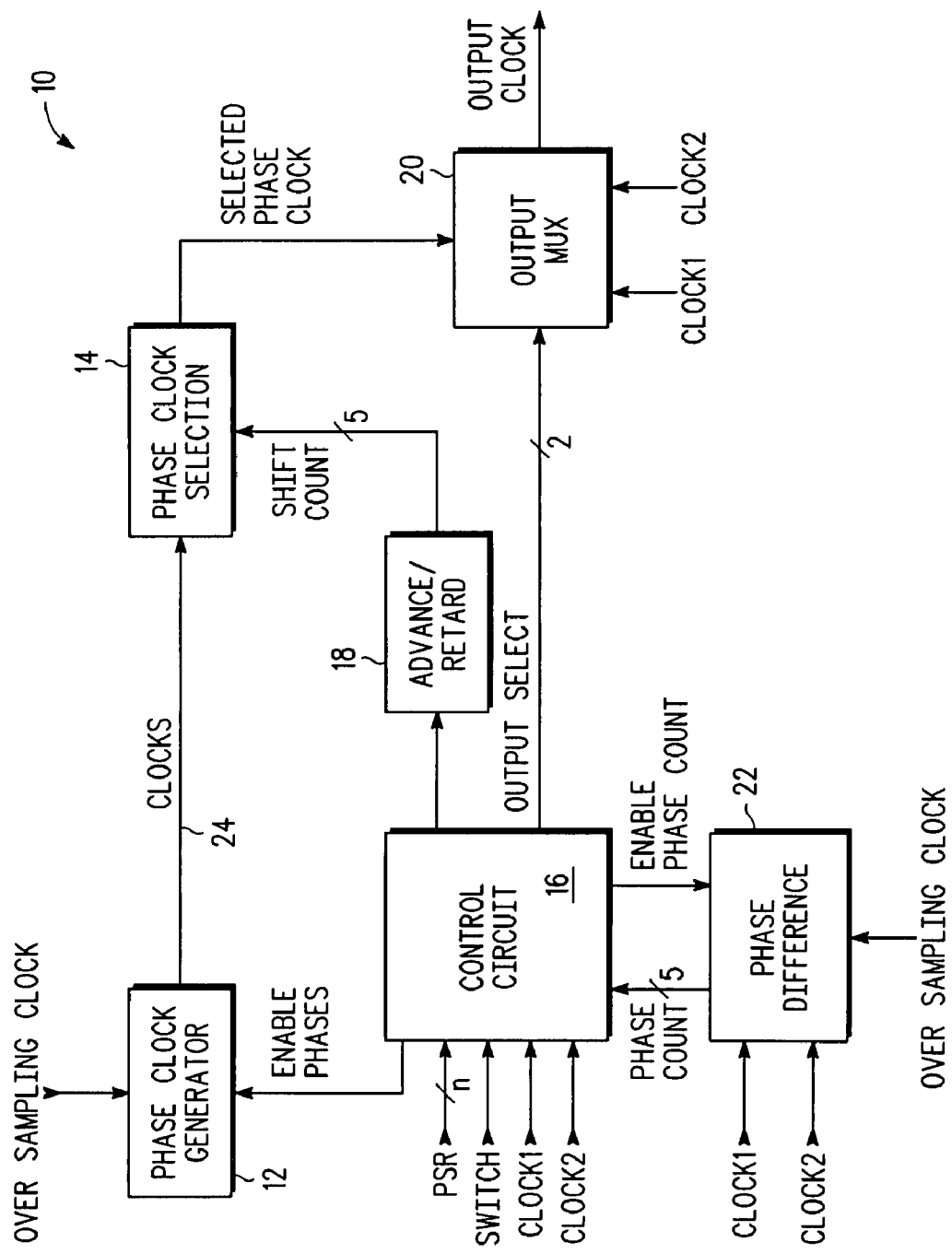
FIG. 1 is a block diagram of a clock transition circuit according to one embodiment.

A clock transition circuit switches from providing a clock output from a source clock to a clock output from a destination clock. A phase difference is detected between the source clock, which is the same as the clock output at a time prior to the transition, and the destination clock. The transition occurs by providing an interim clock that reduces the phase difference between the clock output and the destination clock incrementally. For each clock cycle or predetermined number of clock cycles, the phase difference is reduced by an incremental amount. For each additional clock cycle or predetermined number of clock cycles the phase difference is reduced another incremental amount. The process continues until the phase difference is sufficiently reduced or eliminated and the destination clock then is used instead of the interim clock.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Shown in FIG. 1 is a clock circuit 10 comprising a phase clock generator 12, a phase clock selection circuit 14, a control circuit 16, an advance/retard circuit 18, an output multiplexer (MUX) 20, and a phase difference circuit 22. Clock 1 and clock 2 have the same frequency and may have a common oscillator. In this example, clock 1 is a corrected clock that is useful in matching phase with another clock. Such a clock will be expected to use a PLL and thus require increased power. Clock 2 is an uncorrected clock and thus requires less power to operate than clock 1. Clock circuit 10 can switch outputs between clock 1 and 2. In a switch situation, the clock currently being provided as the output is considered the source clock and the clock that will become the clock being provided is considered the destination clock. Phase clock generator 12 receives an over sampling clock which has a frequency that is a multiple of clocks 1 and 2 and derived from the same source as clocks 1 and 2. In this example, the over sampling clock has a frequency 12 times that of clocks 1 and 2.

Phase clock generator 12 receives the over sampling clock and generates 24 interim clocks of the frequency of clocks 1 and 2 but with a different phase. Accordingly, phase clock generator 12 provides 24 interim clocks, each with a different phase, one phase for each half cycle of 12 consecutive cycles of the over sampling clock. Phase clock selection circuit 14 is coupled to phase clock generator 12 and selects which one of the 24 phase clocks is coupled to output mux 20. Advance/retard circuit 18, which is coupled to control circuit 16 and phase clock selection circuit provides the signal to phase clock selection circuit 14 that identifies which of the interim clocks is coupled to output mux 20. Output mux 20 receives clock 1, clock 2, and the output of phase clock selection circuit 14. Output mux 20 provides an output clock selected among clock 1, clock 2, and the output of phase clock selection circuit 14 as determined by an output select signal from control circuit 16. Control circuit 16 receives a phase shift rate (PSR) signal, a switch signal, clock 1, clock 2, the over sampling clock, and a phase count signal from phase difference circuit 22. In addition to the output select signal, control circuit 16 also provides an enable phases signal to phase clock generator 12 and an advance/retard signal to advance/retard circuit 18. Phase difference circuit 22 receives an enable phase count signal from control circuit 16, clock 1, clock 2, and the over sampling clock.

Shown in FIG. 2 is a timing diagram showing the over sampling clock, a destination clock, the output clock, and a source clock in a case where control circuit 16 has received a switch signal. This shows that the oversampling clock is twelve times the frequency of the destination and source clocks. The source clock can be either clock 1 or clock 2 with the destination clock being the other. Each half cycle of the oversampling clock is numbered for each full cycle of the destination clock. In this example, the switch signal is received prior to the first shown rise of the output clock. At this point the output clock is being supplied by the source clock so they are in phase. They are showing as rising together at phase 5, which is the transition between half cycle 4 and half cycle 5 of the over sampling clock. It should be noted that generally the source and destination clocks are completely asynchronous to the oversampling clock even though they may be derived from the same source. The destination clock is shown rising at phase 1. The difference in phase then between the output clock and the destination clock at the time of the switch signal being asserted is four half cycles. The destination clock is four half cycles ahead of the output clock so that the output clock needs to advance four half clock cycles of the oversampling clock in order to be in phase with the destination clock.

Control circuit 16, in response to receiving the switch signal, asserts the enable phases signal and the enable phase count signal. Phase clock generator 12 responds by generating the 24 interim clocks. Phase difference circuit 22 responds by generating a phase count signal received by control circuit 16. The phase count signal indicates how many half cycles of the over sampling clock the destination clock is advanced from the output clock. In the example of FIG. 2, the number is 4. Control circuit 16 responds by asserting the advance/retard signal. Advance/retard circuit 18 responds by providing the phase clock selection circuit with the shift count signal to indicate to phase clock selection circuit 14 to select the phase clock that is one half cycle (one phase) advanced from the output clock for coupling to output mux 20. At the time of the asserting of the switch signal, output mux 20 is providing either clock 1 or clock 2 as the output clock as determined by the output select signal from control circuit 16. Assume clock 1 is being providing as the output clock so that clock 1 is the source clock and clock 2 is the destination clock. Control circuit 16 determines when the output select signal switches from selecting the source clock to selecting the interim clock provided from phase clock selection circuit 14 as the output clock. In this example, the selection of the interim clock occurs after the source clock has been a logic high for six half cycles of the oversampling clock, which is at phase 11. Thus the output clock beginning at phase 11 is a transition clock selected from the interim clocks. With the transition clock being the interim clock advanced by one phase over the source clock, the output clock drops to a logic low at phase 16 which is one phase earlier than phase 17 where the source clock falls to a logic low. Because the transition clock is the same frequency, the output clock stays at a logic low for the same amount of time as the source clock. The rise of the output clock then occurs at phase 4, one phase ahead of the source clock rising at phase 5. Advance/retard circuit 18 then selects the interim clock that is two phases ahead of the source clock when the output clock has been a logic high for 6 phases. This change is not visible at the output clock at the time that the second interim clock becomes the transition clock. Because the transition clock is now two phase earlier than the source clock, the output clock switches to a logic low two phases earlier than the source clock but only one phase earlier than the previous logic low transition of the output clock.

The process continues similarly for the next two transition clocks. The third transition clock is selected by advance/retard circuit 18 after output clock has been a logic high for six phases. With the new transition clock being the interim clock advanced by three half clock cycles from the source clock, the output clock transitions to a logic low three half cycles earlier than the source clock but only one phase earlier than the previous logic low transition. Similarly for the fourth transition clock, advance/retard circuit 18 selects the interim clock with that is advanced by four phases to the source clock. Because the previous cycle of the output clock was advanced by three phases, the transition clock that is advanced by four phases causes a logic low transition four phases earlier than the source clock, one phase earlier than the previous cycle, and closest in phase with the destination clock. Control circuit then provides the output select signal to indicate to output mux 20 that the destination clock is to be provided as the output clock after the destination clock has been a logic high for 6 phases. What was the destination clock becomes the source clock. Control circuit 16 also de-asserts the enable phases signal to which phase clock generator 12 responds by stopping generation of the interim clocks.

Clock circuit 10 thus achieves a transition from one clock to another by incremental changes in the phase difference between the two. The incremental was described as occurring for every cycle of the transition clock. Control circuit 16 may also select a different rate of change by having the incremental change occur less than once a cycle as selected by the phase shift rate (PSR) signal. The PSR signal may indicate that the incremental change should occur only every other cycle or every third cycle or some other selected interval between incremental changes.

Shown in FIG. 3 is an example in which the destination signal is retarded in relation to the source signal. This shows that the source and output clocks are transitioning to a logic low at phase 9 which is 4 phases before the transition to logic low for the destination clock at phase 13. Thus, the output clock needs to be retarded by 4 phases to be in phase with the destination clock. The operation is similar to that for the example of FIG. 2. Phase clock generator 12 begins generating the 24 interim clocks and phase difference circuit 22 measures the phase difference between the destination clock and the source clock. In this case the phase count provided by phase difference circuit 22, which is the count of phases that the destination clock is in advance of the output clock, is converted in control circuit 16 to a count of the phases that the destination clock is retarded in relation to the output clock. The amount of advanced phases in this example is 20. Thus rather than advancing the output clock 20 phases, clock circuit 10 retards the output clock 4 phases. This reduces the number of iterations to achieve the point where the destination clock can be coupled through the output mux which saves power. Control circuit 16 thus indicates to advance/retard circuit 18 that the interim signal to be first selected by phase clock selection circuit 14 is the one that is retarded by one phase from that of the source signal. Control circuit 16 similarly changes the output select signal to select the output from phase clock selection circuit 14 after 6 phases of the source clock being a logic high. This results in a transition clock being provided as the output clock that switches to a logic low at phase 10, one phase after the source clock transitions to a logic low. Because the interim clock selected as the transition clock is the same frequency as the source clock, they both stay a logic low for the same duration so that the transition back to a logic high for the output clock is one phase after the logic high transition for the source clock. After 6 phases of the first selected interim clock being a logic high, the advance/retard circuit 18 selects the interim clock that is retarded by 2 phases to output mux 20 so that the transition clock being provided as the output clock transitions to a logic low two phases after the source clock transitions to a logic low. The process continues with the third and fourth interim clocks being three and four phases, respectively, retarded from the source clock. The fourth interim clock as the transition clock brings the output clock into phase with the destination clock. Control circuit 16 then switches the output select signal to indicate to the output mux that the destination clock is to be provided as the output clock.

The PSR signal can similarly be used to have control circuit 16 to apply the phase change less than once a cycle.

By now it should be appreciated that there has been provided an apparatus having a multiplexer, a phase difference calculation module, a clock generation module, a clock selection module, and a control circuit. The multiplexer is configured to provide an output clock selected from a source clock, a destination clock, and a transition clock. The transition clock is provided as the output clock during switching the output clock from the source clock to the destination clock. The phase difference calculation module is configured to calculate a phase difference between the source clock and the destination clock. The clock generation module is configured to generate a plurality of clocks. Each of the plurality of clocks has a phase different from another one of the plurality of clocks. The clock selection module is configured to select one of the plurality of clocks as the transition clock. The control circuit is configured to receive a clock switching signal and configured to provide a signal to the clock selection module and a signal to the multiplexer. The signal to the clock selection module for selecting one of the plurality of clocks as the transition clock based on the phase difference between the source clock and the destination clock. The signal to the multiplexer is to provide as the output clock one of the source clock, the destination clock, or the transition clock. The clock selection module may be configured to select one of the plurality of clocks as the transition clock that has substantially same phase as a phase of the source clock for a first duration in response to a signal from the control circuit. The clock selection module may be configured to select one of the plurality of clocks as the transition clock that has a phase within a predetermined period of the phase of the source clock for a second duration subsequent to the first duration in response to a signal from the control circuit. The clock selection module is configured to keep successively selecting another clock out of the plurality of clocks as the transition clock until a phase difference between the transition clock and the destination clock is within a predetermined range in response to a signal from the control circuit. The control circuit is further configured to provide a signal to the multiplexer to initially provide as the output clock the source clock. The control circuit is further configured to provide a signal to the multiplexer to provide as the output clock the transition clock upon receiving the clock switching signal. The control circuit is further configured to provide a signal to the multiplexer to provide as the output clock the destination clock when a phase difference between the transition clock and the destination clock is within a predetermined range.

Also disclosed is an apparatus having a multiplexer, a phase calculation module, a clock generation module, a clock selection module, a clock selection module, and a control circuit. The multiplexer is configured to provide an output clock selected from a source clock, a destination clock, or a transition clock. The transition clock is provided as the output clock during switching the output clock from the source clock to the destination clock. The phase calculation module is configured to calculate a phase difference between the source clock and the destination clock. The clock generation module is configured to generate a plurality of clocks. Each of the plurality of clocks has a phase different from another one of the plurality of clocks. The clock selection module configured to select one of the plurality of clocks as the transition clock and wherein the clock selection module is configured to keep successively selecting another clock out of the plurality of clocks as the transition clock until a phase difference between the transition clock and the destination clock is within a predetermined range. The control circuit is configured to receive a clock switching signal and configured to provide a signal to the clock selection module and a signal to the multiplexer. The signal to the clock selection module is for selecting one of the plurality of clocks as the transition clock based on the phase difference between the source clock and the destination clock. The signal to the multiplexer is to provide as the output clock one of the source clock, the destination clock, or the transition clock. The clock selection module may be configured to select one of the plurality of clocks as the transition clock that has substantially same phase as a phase of the source clock for a first duration in response to a signal from the control circuit. The clock selection module may be configured to select one of the plurality of clocks as the transition clock that has a phase within a predetermined period of the phase of the source clock for a second duration subsequent to the first duration in response to a signal from the control circuit. The control circuit may be further configured to provide a signal to the multiplexer to initially provide as the output clock the source clock. The control circuit may be further configured to provide a signal to the multiplexer to provide as the output clock the transition clock upon receiving the clock switching signal. The control circuit may be further configured to provide a signal to the multiplexer to provide as the output clock the destination clock when a phase difference between the transition clock and the destination clock is within a predetermined range.

There is also a method for providing as an output clock one of a source clock or a destination clock. The method includes generating a phase difference between the source clock and the destination clock. The method further includes generating a plurality of clocks, wherein each of the plurality of clocks has a phase different from another one of the plurality of clocks. The method further includes, in response to receiving a control signal to provide as the output clock the destination clock instead of the source clock, selecting one of the plurality of clocks as a transition clock based on the phase difference between the source clock and the destination clock and providing as the output clock the transition clock until a phase difference between the transition clock and the destination clock is within a predetermined range. The method may further comprise, in response to a control signal, selecting one of the plurality of clocks as the transition clock that has substantially same phase as a phase of the source clock for a first duration. The method may further comprise, in response to a control signal, selecting another one of the plurality of clocks as the transition clock that has a phase within a predetermined period of the phase of the source clock for a second duration subsequent to the first duration. The method may further comprise receiving a signal to initially provide as the output clock the source clock. The method may further comprise providing as the output clock the destination clock when the phase difference between the transition clock and the destination clock is within the predetermined range. The method may further comprise selecting another one of the plurality of clocks as the transition clock that is advanced in phase than the phase of the source clock based on an analysis of the phase difference between the source clock and the destination clock. The method may further comprise selecting another one of the plurality of clocks as the transition clock that is retarded in phase than the phase of the source clock based on an analysis of the phase difference between the source clock and the destination clock.

Because the apparatus implementing the present invention is, for the most part, composed of electronic components and circuits known to those skilled in the art, circuit details has not been explained in any greater extent than that considered necessary as illustrated above, for the understanding and appreciation of the underlying concepts of the present invention and in order not to obfuscate or distract from the teachings of the present invention.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the resolution of the phase change can be changed by changing the frequency of the over sampling clock. The technique for identifying the increment of phase change by using phases of a higher frequency clock is particularly beneficial, but another approach may also be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus comprising:
  a multiplexer configured to provide an output clock selected from a source clock, a destination clock, and a transition clock, wherein the transition clock is provided as the output clock during switching the output clock from the source clock to the destination clock;
  a phase difference calculation module configured to calculate a the phase difference between the source clock and the destination clock;
  a clock generation module configured to generate a plurality of clocks, wherein each clock of the plurality of clocks has a phase different from another one of the plurality of clocks;
  a clock selection module configured to select one of the plurality of clocks as the transition clock, wherein the clock of the plurality of clocks selected first has a phase least different from the source clock from among the plurality of clocks and the phase difference between the clock of the plurality of clocks selected last and the destination clock is within the predetermined range; and
  a control circuit configured to receive a clock switching signal and configured to provide:
  a signal to the clock selection module for selecting one of the plurality of clocks as the transition clock based on the phase difference between the source clock and the destination clock and
  a signal to the multiplexer to identify which one of the source clock, the destination clock, or the transition clock the multiplexer is to provide.

2. The apparatus of claim 1, wherein the clock selection module is configured to select one of the plurality of clocks as the transition clock that has substantially same phase as a phase of the source clock for a first duration in response to a signal from the control circuit.

3. The apparatus of claim 2, wherein the clock selection module is configured to select one of the plurality of clocks as the transition clock that has a phase within a predetermined period of the phase of the source clock for a second duration subsequent to the first duration in response to a signal from the control circuit.

4. The apparatus of claim 3, wherein the clock selection module is configured to keep successively selecting another clock out of the plurality of clocks as the transition clock until a phase difference between the transition clock and the destination clock is within a predetermined range in response to a signal from the control circuit.

5. The apparatus of claim 1, wherein the control circuit is further configured to provide a signal to the multiplexer to initially provide as the output clock the source clock.

6. The apparatus of claim 1, wherein the control circuit is further configured to provide a signal to the multiplexer to provide as the output clock the transition clock upon receiving the clock switching signal.

7. The apparatus of claim 6, wherein the control circuit is further configured to provide a signal to the multiplexer to provide as the output clock the destination clock when a phase difference between the transition clock and the destination clock is within a predetermined range.

8. An apparatus comprising:
  a multiplexer configured to provide an output clock selected from a source clock, a destination clock, or a transition clock, wherein the transition clock is provided as the output clock during switching the output clock from the source clock to the destination clock;
  a phase calculation module configured to calculate e the phase difference between the source clock and the destination clock;
  a clock generation module configured to generate a plurality of clocks, wherein each of the plurality of clocks has a phase different from another one of the plurality of clocks;
  a clock selection module configured to select one of the plurality of clocks as the transition clock and wherein the clock selection module is configured to keep successively selecting another clock out of the plurality of clocks as the transition clock until a phase difference between the transition clock and the destination clock is within a predetermined range; and
  wherein the clock of the plurality of clocks selected first has a phase least different from the source clock from among the plurality of clocks and the phase difference between the clock of the plurality of clocks selected last and the destination clock is within the predetermined range;

a control circuit configured to receive a clock switching signal and configured to provide:

a signal to the clock selection module for selecting one of the plurality of clocks as the transition clock based on the phase difference between the source clock and the destination clock, and a signal to the multiplexer to identify which one of the source clock, the destination clock, or the transition clock the multiplexer is to provide.

9. The apparatus of claim 8, wherein the clock selection module is configured to select one of the plurality of clocks as the transition clock that has substantially same phase as a phase of the source clock for a first duration in response to a signal from the control circuit.

10. The apparatus of claim 9, wherein the clock selection module is configured to select one of the plurality of clocks as the transition clock that has a phase within a predetermined period of the phase of the source clock for a second duration subsequent to the first duration in response to a signal from the control circuit.

11. The apparatus of claim 9, wherein the control circuit is further configured to provide a signal to the multiplexer to initially provide as the output clock the source clock.

12. The apparatus of claim 9, wherein the control circuit is further configured to provide a signal to the multiplexer to provide as the output clock the transition clock upon receiving the clock switching signal.

13. The apparatus of claim 12, wherein the control circuit is further configured to provide a signal to the multiplexer to provide as the output clock the destination clock when a phase difference between the transition clock and the destination clock is within a predetermined range.

14. A method comprising:
providing as an output clock one of a source clock or a destination clock;
providing the source clock an output clock;
identifying the destination clock to be provided as the output clock;
generating a phase difference between the source clock and the destination clock;
generating a plurality of clocks, wherein each of the plurality of clocks has a phase different from another one of the plurality of clocks; and in response to receiving a control signal to provide as the output clock the destination clock instead of the source clock, selecting one of the plurality of clocks as a transition clock based on the phase difference between the source clock and the destination clock and providing as the output clock the transition clock until a phase difference between the transition clock and the destination clock is within a predetermined range, wherein the clock of the plurality of clocks selected first has a phase least different from the source clock from among the plurality of clocks and the phase difference between the clock of the plurality of clocks selected last and the destination clock is within the predetermined range; and providing the destination clock as the output clock after providing the clock of the plurality of clocks selected last as the output.

15. The method of claim 14 further comprising in response to a control signal, selecting one of the plurality of clocks as the transition clock that has substantially same phase as a phase of the source clock for a first duration.

16. The method of claim 15 further comprising in response to a control signal, selecting another one of the plurality of clocks as the transition clock that has a phase within a predetermined period of the phase of the source clock for a second duration subsequent to the first duration.

17. The method of claim 14 further comprising receiving a signal to initially provide as the output clock the source clock.

18. The method of claim 14 further comprising providing as the output clock the destination clock when the phase difference between the transition clock and the destination clock is within the predetermined range.

19. The method of claim 15 further comprising selecting another one of the plurality of clocks as the transition clock that is advanced in phase than the phase of the source clock based on an analysis of the phase difference between the source clock and the destination clock.

20. The method of claim 15 further comprising selecting another one of the plurality of clocks as the transition clock that is retarded in phase than the phase of the source clock based on an analysis of the phase difference between the source clock and the destination clock.

* * * * *

UNITED STATES PATENT AND TRADEMARK OFFICE
CERTIFICATE OF CORRECTION

PATENT NO. : 8,204,166 B2  
APPLICATION NO. : 11/868711  
DATED : June 19, 2012  
INVENTOR(S) : Srinivasa R. Bommareddy et al.

It is certified that error appears in the above-identified patent and that said Letters Patent is hereby corrected as shown below:

IN THE CLAIMS:

At column 7, claim 1, line 57, please change "calculate a the phase difference" to be --calculate the phase difference--

At column 8, claim 8, line 48, please change "calculate e the phase" to be --calculate the phase--

Signed and Sealed this  
Twenty-second Day of January, 2013

David J. Kappos  
*Director of the United States Patent and Trademark Office*